United States Patent [19]
Linsley

[11] 3,836,160
[45] Sept. 17, 1974

[54] STAIR ASCENDING OR DESCENDING CART

[76] Inventor: E. Partridge Linsley, 310 Charbett, Little Rock, Ark. 72204

[22] Filed: Dec. 6, 1972

[21] Appl. No.: 312,489

[52] U.S. Cl............. 280/5.32, 280/5.28, 280/34 B
[51] Int. Cl............................................ B62b 5/02
[58] Field of Search.................... 280/5.2, 5.28, 5.32

[56] References Cited
FOREIGN PATENTS OR APPLICATIONS

| | | | |
|---|---|---|---|
| 1,098,777 | 1/1968 | Great Britain..................... | 280/5.32 |
| 430,112 | 2/1948 | Italy.................................. | 280/5.28 |
| 442,859 | 12/1948 | Italy.................................. | 280/5.28 |

*Primary Examiner*—Leo Friaglia
*Attorney, Agent, or Firm*—Cushman, Darby & Cushman

[57] ABSTRACT

A cart is disclosed for assisting one in moving an object up or down stairs. Rear wheels rotatable about a fixed axis and rotatable front wheels mounted movably with respect to the rear wheels are provided. The front wheels are spring-biased toward a forward position with respect to the rear wheels. A pull back system is provided for allowing stair descent by pulling the front wheels toward a backward position relative to the rear wheels after the front wheels have cleared an upper step as a result of backward pivoting of the cart about the rear wheel axis.

8 Claims, 11 Drawing Figures

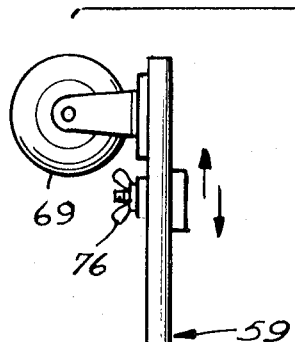
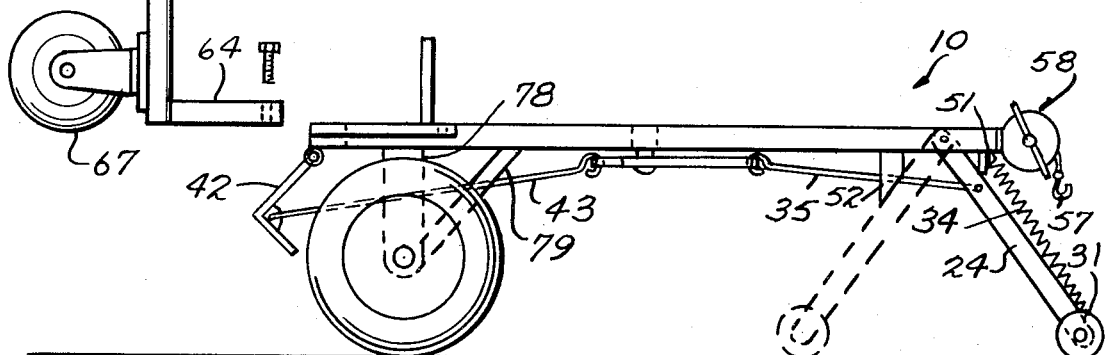
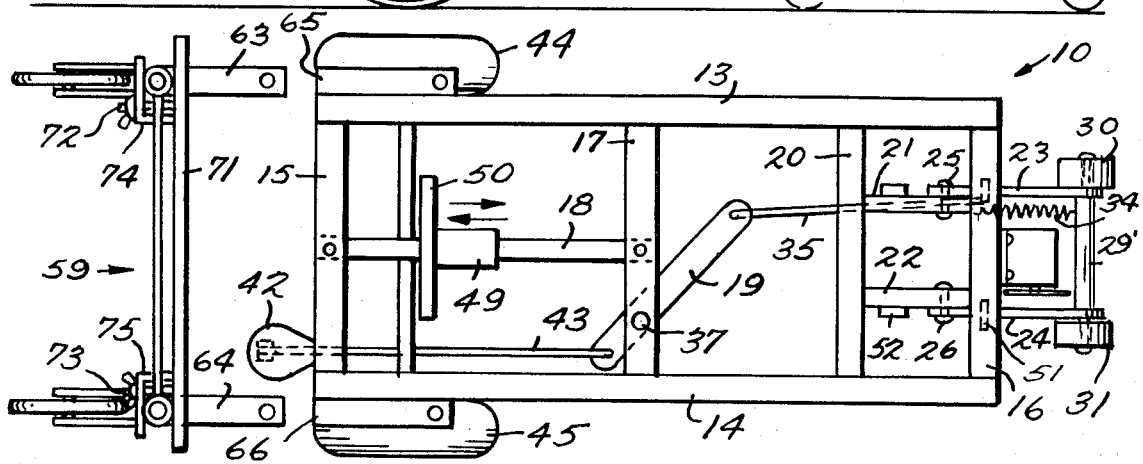
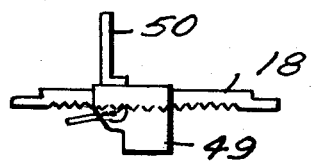
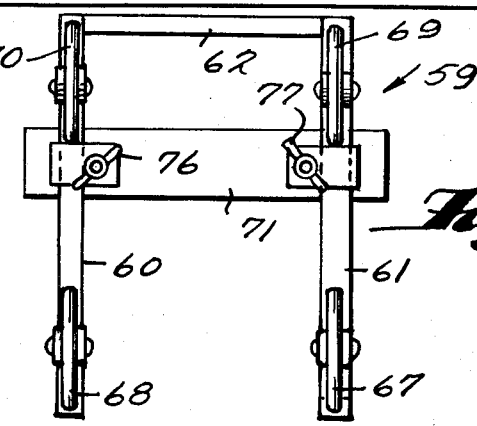
Fig. 1.
Fig. 2.
Fig. 3.
Fig. 4.

STAIR ASCENDING OR DESCENDING CART

OBJECTS OF THE INVENTION

An object of my invention is to provide a carrying cart so designed to allow any man capable of carrying one end of a television, appliance or similar load to smoothly manipulate the stair climbing cart loaded with such item up or down stairs unassisted.

A further object of my invention is to provide a stair climbing cart so designed to allow any man capable of carrying one end of a television, appliance, or similar load to smoothly manipulate the stair climbing cart loaded with such item into and out of van type delivery vehicles unassisted.

A still further object of my invention is to provide a stair climbing cart so designed to allow any man capable of carrying one end of a television, appliance or similar load to move such items inside, or outside shops or homes as the need arises unassisted.

Still further objects and the entire scope of applicability of the present invention will become apparent from the detailed description given hereinafter. It should be understood, however, that the detailed description and specific examples are given by way of illustration only, and while indicating preferred embodiments of the invention are not given by way of limitation, since various changes and modifications within the spirit and scope of the invention will become apparent to those skilled in the art from this detailed description.

BRIEF DESCRIPTION OF THE DRAWINGS

For a more complete understanding of the nature and scope of my invention reference may be had to the drawings in which the figures are described as follows:

FIG. 1 is a side elevation of the Stair Ascending or Descending Cart of the invention;

FIG. 2 is a top plan view of the Cart shown in FIG. 1;

FIG. 3 is a side elevation of an automotive bumper type jack assembly that may be used as a lifting means in the instant invention;

FIG. 4 is a back elevation of a removable handle that may be used with the cart of the instant invention;

DETAILED DESCRIPTION OF THE INVENTION

Figure 5A:
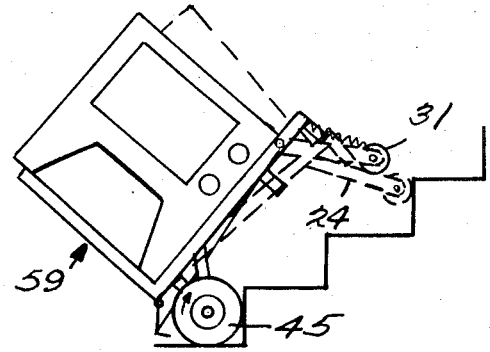
FIGS. 5(a) – 5(d) are diagrammatic views of the operation of the cart for stair ascent.
Figure 5B:
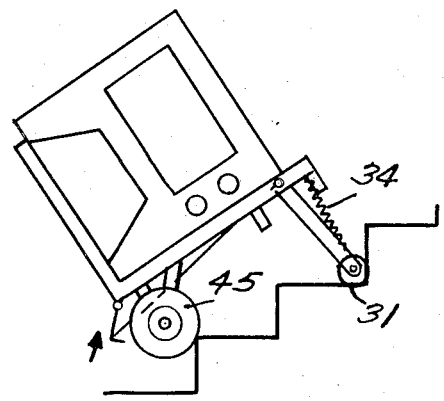

Throughout the description that follows in this specification like reference numerals refer to similar parts.

Referring particularly to FIGS. 1 and 2, general reference number 10 represents the Stair Ascending or Descending Cart.

The frame of the Cart 10 consists of parallel angle type members 13 and 14. The angle type members 13 and 14 extend from, and are welded to, rear angle type cross member 15 and to front angle type cross member 16. An angle type support or brace 17 is welded between members 13 and 14 and serves as support for a lifting menas, such as the automotive bumper type jack mechanism rod 18. Support or brace 17 also serves as pivot point for front wheel pull back bar 19. Another angle type support or brace 20 is welded between members 13 and 14. Angle type front wheel supports 21 and 22 are welded between cross members 16 and 20. Front wheel support arms 23 and 24 are connected to supports 21 and 22 with bolts, flat washers, nuts and jam nuts 25 and 26 in a manner that allows freedom of movement of arms 23 and 24. Stops 51 and 52 limit the length of travel of arms 23, 24. Arms 23 and 24 are attached to the front wheel axle 29. Roller bearing hard rubber front wheels 30 and 31 are attached to the front axle 29. The front wheels are normally held in the extended position by spring tension for instance by a spring 34 between front wheel axle 29 and cross member 16. The front wheel pull back assembly can include, for instance, a front wheel pull back bar 19 connected to front wheel support arm 23 by rod 35 and held in place by pin (not shown) through rod 35. Front wheel pull back bar 19 is pivoted from cross member 17 as shown in FIG. 2 by bolt system 37. Front wheel pull back bar 19 is connected to pull back lever 42 by rod 43. Rear wheel axle 46 is attached to support 78 which is welded to the frame. Brace 79 is welded to the frame and support 78. Air filled rear tires 44 and 45 are mounted on ball bearing wheels and are attached to axle 46 a lifting means, such as the automotive bumper type jack body 49 is welded to L shaped lifting platform 50 (see FIGS. 2 and 3). Jack rod 18 is attached to cross members 15 and 17. Lifting platform 50 has a hole in the center to receive strap tightening hook 57 on a strap that may be wrapped around an object to be carried on the cart to hold it to the cart. Strap tightener 58 may be provided. The removable handle 59 (FIG. 4) consists of two parallel tubular members 60 and 61 connected together at the top by a square shaped tubular member 62. At the bottom are two square shaped tubular members 63 and 64 best shown in FIG. 2. The handle 59 is attached to the cart by sliding members 63 and 64 into square shaped brackets 65 and 66 welded on the outside edges of members 13 and 14 flush with the back end of members 13 and 14. The removable handle is held in place by unthreaded pins placed in holes in members 63 and 64 and members 65 and 66. As shown in FIG. 4 the removable handle may be equipped with two rigid plate rubber tired casters 67 and 68. FIG. 4 also shows best two swivel plate rubber tired casters 69 and 70. The handle casters may be used to allow movement of the cart while preventing tracking of the floor if the main wheels 44, 45 are muddy or wet. FIGS. 2 and 4 show movable support board 71 held in place on handle 59 by bolts 72 and 73, brackets 74 and 75, and wingnuts 76 and 77.

OPERATION OF THE INVENTION

When the operator wishes to move an object he places lifting platform 50 underneath the object and raises the object off the ground with jack 49 or other suitable lifting means. The method of ascending stairs is depicted in FIGS. 5(a) – 5(d). To ascend stairs, the operator stands at the rear of the cart and applies foot pressure against the back of cross member 15 to cause the rear wheels 44, 45 to bear against a stair riser (FIG. 5(a)). Then he pivots the front wheels 30, 31 forwardly (as with handle 59) into engagement with an upper step (dotted line position of FIG. 5(a)). The operator then lifts the back wheels 44, 45 to the top of the first step while the front wheels 30, 31 support the front end of the cart by engaging the riser of an upper stair (FIG.

Figure 5C:
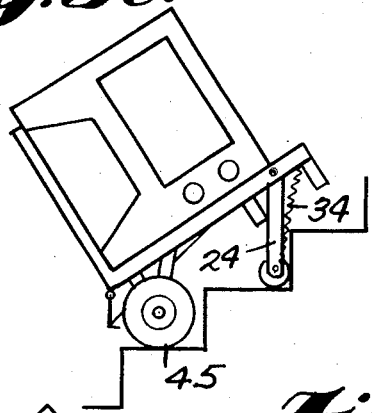
Figure 5D:
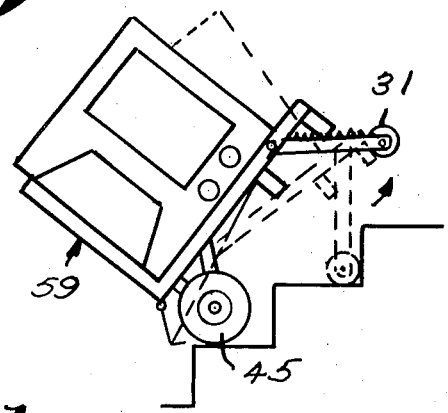

5(b)); forward movement of the cart is permitted by rearward rotation of the arms 23, 24 about their pivotal connections with the frame of the cart at 25, 26 against the tension of the front wheel biasing means (such as spring 34) (see FIGS. 5(c) and 2). Once the rear wheels are completely on the step the operator again applies foot pressure against the back of the cross member 15 and pivots the cart backwardly (FIG. 5(d)), as with handle 59, until the front wheels clear the upper stair by spring 34 returning them to their forward position (solid line position of FIG. 5(d)); then he pivots the cart forwardly until the front wheels 30, 31 engage another upper step. This procedure is repeated until the stairs have been ascended.

Figure 6A:
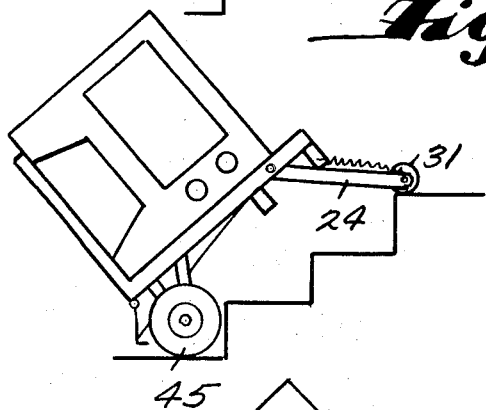
FIGS. 6(a) – 6(c) are diagrammatic views of the operation of the cart for stair descent.
Figure 6B:
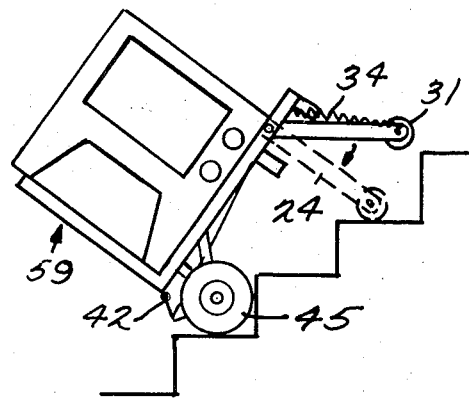
Figure 6C:
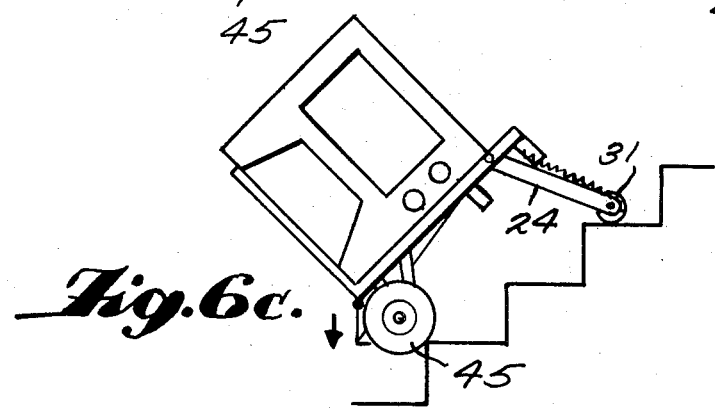

The method of descending stairs is depicted in FIGS. 6(a) – 6(c). When the operator wishes to descend stairs, he again stands at the rear of the cart and eases the back wheels 44, 45 down one or more steps until the front wheels 30, 31 are near the edge of the top step (FIG. 6(a)). Then the operator places the toes of one foot on rear cross member 15 and his heel on pull back lever 42, and pivots the cart backwardly to raise the front wheels 30, 31 up while applying pressure on pull back lever 42 to pull the front wheels back to the next step against the bias of the front wheel biasing means (such as spring 34) (see FIGS. 6(b) and 2). Then by pivoting the cart forwardly he lets the front wheels down on the next step; now the back wheels can be eased down one step (FIG. 6(c)), and the procedure repeated until the stairs have been descended.

To lift an object on the cart into a van, the operator merely moves the front wheels 30, 31 into engagement with the floor of the van and lifts the back wheels 44, 45 off of the ground while pushing the cart into the van.

The foregoing specific embodiment has been described for the purpose of illustrating the principles of the instant invention, and the same is subject to modification without departure therefrom. Therefore, the invention includes all modifications encompassed within the spirit and scope of the appended claims.

I claim as my invention:

1. A stair ascending or descending cart comprising
   a. a frame,
   b. two rear wheels,
   c. means mounting said rear wheels on said frame adjacent the rearward portion thereof for rotation about an axis operatively fixed with respect to said frame,
   d. front wheel means,
   e. means for mounting said front wheel means on said frame for (1) rotational movement about an axis of rotation generally parallel to the axis of rotation of said rear wheels and (2) movement of said front wheel means axis between a forward position and a backward position relative to said rear wheels so that the wheel base of said cart is varied in response to the movement of said front wheel means axis,
   f. spring means biasing said front wheel means into said forward position, and
   g. stair descent facilitating means disposed in a position of convenient engagement by an operator stationed rearwardly of said cart and extending therefrom into operative relation with said front wheel mounting means for effecting movement of said front wheel means toward said backward position against the bias of said spring means in response to operator engagement after said cart has been moved pivotally backward about said rear wheel axis of rotation to effect clearance of said front wheel means of an upper step so that upon forward pivotal movement of said cart about said rear wheel axis of rotation said front wheel means will engage a lower step and upon release of said stair descent facilitating means said spring means is operable to facilitate manually controlled movement of said rear wheels into engagement with a lower step.

2. A stair ascending or descending cart as recited in claim 1 wherein said means for mounting said front wheel means on said frame for movement between said forward and said backward positions includes pivoted arm means.

3. A stair ascending or descending cart as recited in claim 2 wherein said means for mounting said front wheels for rotational movement about an axis of rotation includes an axle, and wherein said pivoted arm means are attached to said frame and said axle.

4. A stair ascending or descending cart as recited in claim 1 wherein handle means for effecting said backward and forward pivotal movement of said cart about said rear wheel axis is removably attached to said frame.

5. A stair ascending or descending cart as recited in claim 1 wherein strap means are provided for strapping an object to be moved onto said frame of said cart.

6. A stair ascending or descending cart as recited in claim 1 wherein stop means are mounted on said frame for limiting the backward and forward movement of said front wheel means.

7. A stair ascending or descending cart as recited in claim 1 further comprising lift means mounted on said frame for engaging an object to be moved by said cart means and lifting said object off the ground, whereby extensions of said object cannot catch on any floor surfaces as said object is moved by said cart.

8. A stair ascending or descending cart as recited in claim 1 wherein said stair descent facilitating means includes a foot operated pivoted lever in direct motion transmitting relationship with said means for mounting said front wheel means.

* * * * *